United States Patent Office 3,397,954
Patented Aug. 20, 1968

3,397,954
PROCESS FOR DEHYDRATING BORIC ACID
Joseph L. Russell, Ridgewood, and Jack B. Feder, Dumont, N.J., assignors to Halcon International, Inc., a corporation of Delaware
No Drawing. Filed Sept. 1, 1964, Ser. No. 393,751
3 Claims. (Cl. 23—149)

ABSTRACT OF THE DISCLOSURE

This invention is directed to the dehydration of boric acid by heating a slurry thereof in an organic liquid to a temperature of 110° C. to 160° C. until a major portion has been converted to metaboric acid.

---

The present invention is concerned with an improved method for the dehydration of boric acid. In particular, the present invention is concerned with the continuous dehydration of boric acid in admixture with an organic liquid to produce a finely divided suspension of dehydrated orthoboric acid particles in said organic liquid.

The continuous dehydration of orthoboric acid has assumed considerable importance in view of the increasing use of the dehydrated forms in various chemical processes. For example, in the oxidation of organic compounds, metaboric acid or derivatives thereof containing less or no water of hydration are valuable in the selective production of hydroxyl derivatives of the organic compounds. In a continuous type operation, the boric acid material is conveniently recovered by hydrolysis and crystallization in the form of orthoboric acid. For further use in the oxidation, it is important that this orthoboric acid be dehydrated to at least metaboric acid in a rapid and convenient manner and in such a form as to be readily useable in the succeeding process cycles.

It is an object of the present invention to provide an improved method for dehydrating orthoboric acid.

It is a further object of the invention to provide an improved method for continuously dehydrating orthoboric acid in admixture with an organic liquid to produce a suspension of finely divided particles of dehydrated boric acid in said organic liquid.

Other objects of this invention will be apparent from the following description of the invention.

It has been found that when in a continuous dehydration operation a suspension of orthoboric acid particles in an organic liquid is rapidly heated to a temperature of the order about 165° C. at dehydration conditions, such as by adding a continuous stream of this mixture to a large body of liquid maintained at the dehydration temperature, an agglomeration of the boric acid particles occurs with the formation of large particles or "balls" of dehydration material which plug equipment and otherwise interfere with operation. This is most surprising in view of the fact that the melting points of the various boric acid hydrate compounds is considerably in excess of 165° C.

In accordance with the present invention, orthoboric acid in particulate form in admixture with an organic liquid is dehydrated at temperatures in the range of 110 to 160° C., preferably 140 to 155° C., until at least about 50%, preferably until at least about 70%, of the orthoboric acid is dehydrated to metaboric acid. Thereafter, if desired, the temperature can be raised substantially above 160° C., for example to 170° C., or higher, without "balling" or agglomeration occurring.

Numerous embodiments of the invention are possible. In a preferred embodiment, the slurry of orthoboric acid in organic liquid is continuously introduced into a large body of liquid maintained at a temperature not greater than 160° C., and preferably 140 to 155° C. A continuous stream of metaboric acid slurried in the organic liquid is withdrawn from the large body, the flow rates being adjusted to provide for sufficient residence time to complete the dehydration to metaboric acid.

In an additional further embodiment of the invention, which embodiment finds preference under certain circumstances, the slurry of orthoboric acid in organic liquid is first maintained at a temperature not greater than 160° C., to effect a dehydration of at least about 50% of the orthoboric acid to metaboric acid. After dehydration at the lower temperature to the desired extent, the dehydration can then be carried out more rapidly at a higher temperature until substantial completion.

Through operation in accordance with the present invention, there is produced a slurry of very finely divided solid particles of dehydrated orthoboric acid in admixture with the organic liquid. Such slurries find wide application in various chemical processes. In an outstanding instance, the resulting slurry is subjected to oxidative contact with molecular oxygen whereby the organic compound is selectively oxidized to a borate ester. The borate ester can conveniently be inverted to the hydroxyl derivative by hydrolysis techniques with regeneration of orthoboric acid.

It can readily be seen that in a cyclic type operation the present dehydration technique has outstanding advantages.

The temperatures of the present dehydration are in the range of 110° C. to 160° C. until at least 50% of the orthoboric acid has been dehydrated to metaboric acid. Preferred temperatures in accordance with the present process are of the order of about 140 to 155° C.

The dehydration reaction is, of course, carried out under conditions such that dehydration can occur. That is, conditions of water vapor pressure in the dehydration zone are maintained below the equilibrium point for the reaction.

orthoboric acid ⇌ metaboric acid + water at the particular temperatue. Stripping gases, preferably inert such as nitrogen, although air can also be used, are useful during the dehydration.

The organic liquid which is in admixture with the boric acid during the present process is suitably a hydrocarbon having from about 4 to 30 carbon atoms. Saturated and unsaturated aliphatic and alicyclic hydrocarbons as illustrated by pentane, hexane, cyclohexane, heptane, cycloheptane, octane, dodecane, cyclododecane, 2-methylpentene-1, cyclohexene, and the like are appropriately employed in this invention. Substituted hydrocarbons can also be employed. Examples of substituent groups on the above designated hydrocarbons include hydroxal groups, sulfo groups, nitrile groups, borate groups, carboxyl groups and the like. Usually the orthoboric acid is dispersed in amounts of about 0.1 to 20% by weight of the resulting slurry.

The following examples are provided to illustrate the present process. Unless otherwise designated, parts and percentages as presented are by weight.

Example 1

About ten (10) parts of orthoboric acid in finely divided form are slurried in about 200 parts of cyclohexane. This slurry is pumped to a dehydration zone wherein the slurry is rapidly heated to a temperature of about 145° C. The slurry undergoes rapid dehydration with the continuous evolution of a mixture of cyclohexane and water layer is separated from the cyclohexane layer. The cyclohexane is returned to the beginning of the process.

The dehydration zone is maintained at a pressure of about 80 p.s.i.g. After residence time in the dehydration zone of about 30 minutes, there is obtained a slurry of metaboric acid in very fine uniform particles in the cyclohexane.

Subsequently, this resulting slurry is oxidized at about 170° C. by contact with a molecular oxygen containing gas. The oxidation mixture is hydrolyzed to recover cyclohexanol and cyclohexanone. Crystals of boric acid in the aqueous hydroylsis phase are recovered as by filtration and the recovered crystals are slurried in cyclohexane and treated similarly as designated above.

Example 2

Example 1 is repeated except that the slurry is dehydrated at the 170° C. oxidation temperature. After dehydration, there is obtained dehydrated boric acid in the form of large lumps in the cyclohexane. The large lumps of dehydrated boric acid clog equipment and interfere with process operation.

We claim:

1. The method for dehydrating boric acid which comprises heating a slurry consisting essentially of ortho boric acid in an unsubstituted hydrocarbon having 4 to 30 carbon atoms to a temperature in the range of 110° C. to 160° C. until at least 50% of the ortho boric acid is dehydrated to meta boric acid and recovering a slurry consisting essentially of finely divided meta boric acid in said hydrocarbon.

2. The method of claim 1 wherein the hydrocarbon is cyclohexane.

3. The method of claim 1 wherein the temperature is in the range of 140 to 155° C.

References Cited

UNITED STATES PATENTS 2,331,965   10/1943   Dreyfus _____ 23—149 X
2,833,623   5/1958   May et al. _____ 23—149

OSCAR R. VERTIZ, *Primary Examiner.*

H. T. CARTER, *Assistant Examiner.*

UNITED STATES PATENT OFFICE
CERTIFICATE OF CORRECTION

Patent No. 3,397,954                                                August 20, 1968

Joseph L. Russell et al.

It is certified that error appears in the above identified patent and that said Letters Patent are hereby corrected as shown below:

Column 2, line 67, after "water" insert -- vapors. These vapors are condensed and a water --.

Signed and sealed this 27th day of January 1970.

(SEAL)
Attest:

Edward M. Fletcher, Jr.                              WILLIAM E. SCHUYLER, JR.
Attesting Officer                                                Commissioner of Patents